Figure 1:
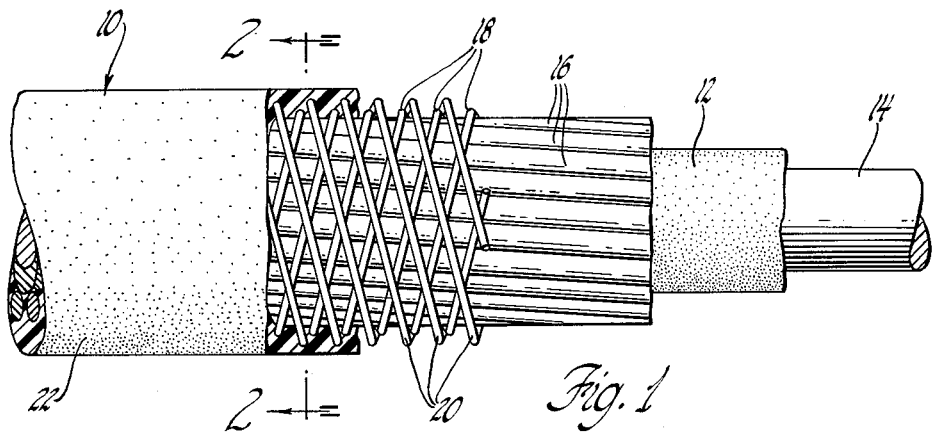

INVENTOR.
Bernard I. Tenreiro
BY
Barnard & McGlynn
ATTORNEYS

United States Patent Office 3,230,979
Patented Jan. 25, 1966

3,230,979
HIGH STRENGTH FLEXIBLE CONDUIT
Bernard I. Tenreiro, Willow Grove, Pa., assignor to Teleflex Incorporated, North Wales, Pa., a corporation of Delaware
Filed Aug. 2, 1962, Ser. No. 214,398
4 Claims. (Cl. 138—130)

The present invention relates to flexible conduit of the type including an inner flexible tubular member overlaid with a plurality of long lay wire elements in turn wrapped by hoop strength-increasing members all encased in a common outer plastic sheath. A flexible conduit of this general type is shown in copending application Serial No. 771,984 Cadwallader, filed November 5, 1958, now Patent No. 3,063,303. This type of conduit is adapted to movably support a core element or cable within a low frictional resistance plastic tubular member.

Conduit manufactured in accordance with the aforementioned Cadwallader application generally consists of a plastic liner formed of a low frictional resistance material such as Teflon. Typically, the Teflon inner tubular member is overlaid with a full complement of long lay wires, e.g. on a 12 inch pitch, to form a tension load bearing sheath. To increase the hoop strength or compression carrying strength of such a conduit, the long lay wire sheath is wrapped with a plurality of glass strands or wire on a short pitch, e.g. one-half inch.

Whether using glass strands or wire on a short pitch this type of conduit has been much stronger in tension than in compression. Typically, the use of eight glass strands on a short pitch has resulted in a conduit with a breaking strength in compression of 750 pounds and up depending on the conduit size. The same conduit would fail in tension well in excess of 3,000 pounds.

It is possible to improve the compression strength of such conduit by the substitution of music wire, e.g. .015 diameter for the stranded glass in a .187 inch bore conduit. This substitution in combination with .042 diameter long lay wires results in a conduit which will fail in compression at about 2400 pounds. However, the conduit begins to yield at about 2000 to 2100 pounds and is essentially useless after being subjected to such yield load. Even this type of compression load improvement is inadequate for certain high compression load environments.

For instance, in outboard motor steering controls instantaneous compression loads have in the past frequently exceeded the compression load capacity of conduits utilizing plastic inner tubular members. In the case of an outboard motor steering control mechanism utilizing flexible conduit, it is common to construct the steering mechanism with a 16:1 mechanical advantage between the steering wheel and the motor. Thus, the steering force applied by the operator is multiplied by a factor of sixteen (16) which in a severe steering condition can impose extremely high loads on the conduit. Another source of extreme conduit stressing in such environments is the feedback of loads imposed on the motor. For instance, a wave striking a motor can subject the control conduit to severe momentary compression loads which have caused conduit failures.

On the other hand, it has long been possible to construct a flexible conduit having very high compression loading capacity in various ways including the use of a metal inner tubular member of the monocoil or ribbon type in which the coil convolutions are abutting. This type of metal inner tubular member is shown in Patent 2,187,873 Bratz. Such a conduit has a considerable column strength. Until the development of the subject conduit, efforts to take advantage of the low friction and dirt sealing characteristics of a plastic inner tubular member have been made at a considerable sacrifice in conduit compression load carrying capacity and have been unsatisfactory in certain applications.

The present invention relates to a flexible conduit member utilizing such a plastic inner tubular member and which conduit is uniquely constructed so as to have a very high compression load carrying capacity.

In the present invention the inner flexible plastic tubular member is overlaid with a full complement of long lay wires which form a tension load bearing sheath. The sheath, in turn, is overlaid with a first layer of short lead elements wrapped in one direction and a second layer of short lead elements wrapped in the opposite direction and overlaying the first layer of short lead elements. As in the past, the entire conduit is encased in a plastic sheath. As compared with the aforementioned conduit, supra, where all of the short lead wires are laid in the same direction relative to the tension sheath and which conduit begins to yield in compression at about 2,000 pounds, the subject conduit using the same size and number of short lead wires, but dividing them into two separate layers wrapped in opposite directions has resulted in a conduit which fails in compression in excess of 3,000 pounds.

A further advantage of the subject conduit is that by the unique manner of wrapping the short lead wires, the yield point is within a few pounds of the fail-load in compression. Since such conduit for all intents and purposes is useless after the yield load is exceeded, it is desirable to have the yield load as close to the fail load as possible.

The details as well as other objects and advantages of the present invention will be apparent from a perusual of the detailed description which follows.

Figure 2:
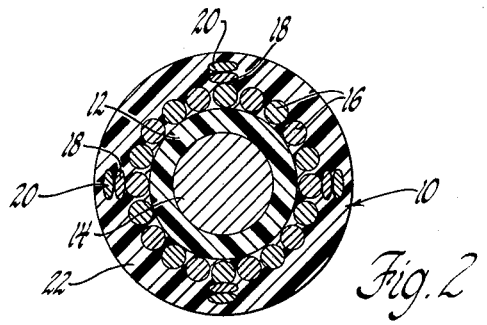
Figure 3:
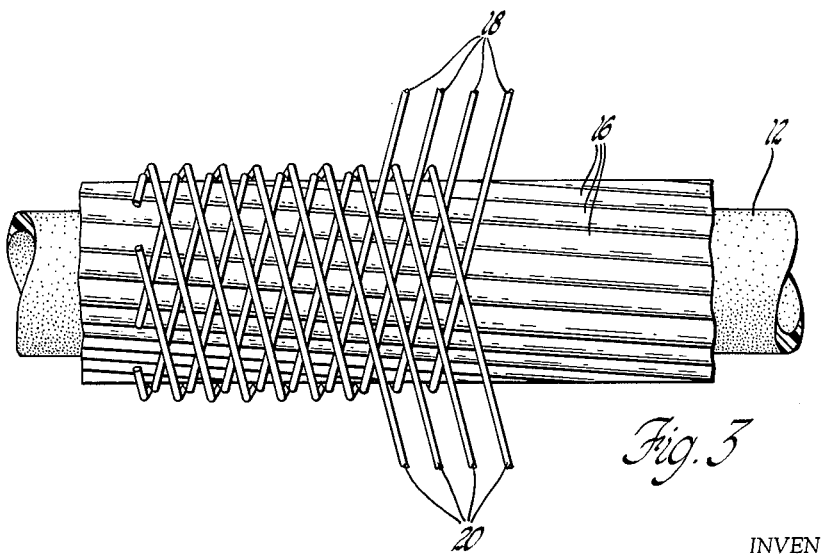

In the drawings:
FIGURE 1 is a broken away view of the subject conduit;
FIGURE 2 is a view along line 2—2 of FIGURE 1;
FIGURE 3 is a fragmentary view showing the short lead wire layers partially unwrapped.

Referring to FIGURE 1, a flexible conduit is indicated generally at 10. Conduit 10 includes a flexible plastic inner tubular member 12 formed of any suitable low frictional resistance material which is also chemically inert relative to water, oil or other substances to which the conduit is likely to be exposed in operation. A core element 14 is movably supported within tubular member 12 and may be either or both a push-pull or a rotatable component.

A full complement of wire elements 16 is laid about the inner tubular member 12 on a long lead or helix, e.g. an approximate 12 inch pitch, and forms a tension load bearing sheath. In referring to a "full complement" of wires 16, it is not intended to imply that adjacent wires are in abutting relationship. As a matter of fact, and as best seen in FIGURE 2, it is preferred to leave a small amount of circumferential spacing between adjacent of the long lay wires to greatly reduce the rubbing friction between said wires during cable flexing which enables the conduit to remain highly flexible. Where the long lay wires are packed in tight or are in abutting relation to form a closed sheath, the friction between abutting wires greatly diminishes the flexibility of a conduit and particularly its ability to naturally return to a straight line condition. Thus, a "full complement" of long lay wires simply means that, in general, the cumulative clearance between adjacent wires is insufficient to permit the addition of another wire of the same diameter as those constituting the wire sheath.

The gauge or size of wires 16 will, of course, vary depending on the size and stiffness of the conduit desired. A typical conduit might include a .187 inch bore (I.D. of inner plastic tube) with twenty-one .042 inch diameter long lay wires.

The conduit as thus far described is adapted to movably support core element or cable 16 within plastic tubular member 12 and is also capable of withstanding tension loading. The next structural portion of the conduit is comprised of the two groups of wire elements respectively designated 18 and 20 which are wrapped around the long lay wire sheath 16. In the illustrated embodiment, the first or inner layer of wires 18 is comprised of four wires wrapped on a short lead while the second layer 20 overlaying the first layer is likewise formed of four wires laid on an identical lead but in the opposite direction so as to cross wires 18.

The crossed wire layers 18 and 20 restrain the long lay wires 16 against radially distending or buckling during compression loading conditions and hence significantly increase the hoop strength of the overall conduit.

The significance of crossing two layers 18 and 20 of short lead elements, as illustrated, in combination with subadjacent long lay wires 16 has already been graphically demonstrated by showing that the same number of short lead wire elements when laid in the same direction provides a conduit which yields in compression at about 2,000 pounds whereas the dividing of these same elements into two layers half of which are wound in one direction and the other half of which are wound in the opposite direction yields approximately a fifty percent improvement in compression loading capacity, to wit, approximately 3,000 pounds. It is significant that this considerable improvement in conduit compression load carrying capacity is achieved while maintaining the same number of components and conduit weight and also not increasing manufacturing costs.

It is also to be noted that the respective wires forming the inner and outer layers 18 and 20 are not and need not be interwoven but may simply be laid as separate and distinct layers of wires which greatly simplifies the conduit formation as well as greatly increasing the speed with which it may be manufactured as compared with a woven wire construction.

While the lead or helix angle with which wires 18 and 20 may be wrapped may be varied, it has been found very satisfactory to wrap these wires with a half inch lead or pitch. In other words, one convolution of wire will be made for each half inch of longitudinal length of the conduit.

As best seen in FIGURES 1 and 3, tension sheath 16 twists generally to the right. It is preferred that the first layer 18 of short lead wires twist in the opposite direction, or to the left in the illustration, relative to the subadjacent sheath wires. It is believed that this arrangement also contributes to the unexpected increase in conduit compression load capacity.

It is important to note that short pitch wires 18 and 20 are of considerably smaller diametral size than long lead wires 16. In general, the diameter of wires 18 and 20 is approximately one half that of wires 16.

Many advantages derive from being able to utilize the relatively smaller diameter short pitch wires. As noted, the unique manner in which wires 18 and 20 are laid results in an approximate fifty percent increase in conduit compression load capacity. However, the small diameter of these wires also enables them to be laid from spools rapidly much in the manner of laying thread or fiber roving. This is particularly important where such wires must be laid on a short pitch. Where a heavier wire is laid on a short pitch, it frequently must be rolled on or otherwise laid in a manner considerably slower than the rate at which long lead wires 16 can be laid thereby slowing the rate of conduit manufacture. On the other hand, wires 18 and 20 can be laid on their short pitch at substantially the same rate as long lead wires 16 resulting in rapid conduit manufacture.

The further advantages of lower cost and weight are realized in using the small diameter wires 18 and 20.

Conduit 10 is completed by extruding a plastic sheath 22 thereabout. Sheath 22 may be formed of any suitable plastic material having the requisite physical properties compatible with the type of use to which the conduit will be subjected. Plastic sheath materials which are satisfactory are nylon, Teflon, polyethylene, polypropylene, etc.

As best seen in FIGURES 1 and 2, plastic sheath 22 is extruded so as to flow within the interstices formed by wires 18 and 20. In this way the plastic sheath itself is firmly anchored to the conduit structure. In addition, the convolutions of wires 18 and 20 are maintained in their properly spaced orientation as originally laid.

In summary, and while various elements and possible subcombinations thereof may be known, applicant has provided a unique combination of elements organized in such a way as to take advantage of an extremely low frictional resistance inner tubular member which at the same time has resulted in a conduit which is at least 50% stronger in compression loading than any similar type of conduit as used in the past.

I claim:

1. A flexible conduit comprising a plastic inner tubular member, a plurality of wire elements laid about said tubular member on a long lead, a first layer of single-strand wire elements wrapped tightly directly upon said long lead elements and on an opposite lead thereto, said first layer of single-strand wire elements contacting substantially each one of said long lead elements, a second layer of single-strand wire elements wrapped tightly directly upon said first layer of elements and radially spaced thereby from said long lead elements, said first and second single-strand wire elements being wrapped on opposite leads relative to each other and on substantially short leads, adjacent convolutions of the wire elements of said first and second layers being substantially equally and relatively closely spaced longitudinally of the conduit, the diameter of each of said single-strand wire elements of said first and second layers being substantially smaller than the diameter of said wire elements laid on a long lead, and a plastic sheath substantially surrounding and contacting each of said single-strand wire elements to maintain the convolutions of said first and second layers in their substantially equally spaced relationship.

2. A flexible conduit comprising a plastic inner tubular member, a plurality of wire elements laid on a long lead to form a sheath helically wrapped in one direction around said inner tubular member, a first layer of single-strand wire elements laid with a short lead directly upon said sheath and helically wrapped tightly thereupon in the opposite direction to said sheath wrap, said first layer of said single-strand wire elements being in contact with substantially each one of the long lead elements of said sheath, a second layer of single-strand wire elements laid on a correspondingly short lead directly upon said first layer of wire elements and helically wrapped tightly thereupon in the opposite direction from said first layer of wire elements, said second layer of single-strand wire elements being radially spaced from said sheath by said first layer of wire elements, adjacent convolutions of the wire elements of said first and second layers being substantially equally and relatively closely spaced longitudinally of the conduit, the diameter of each of the wire elements of said first and second layers being substantially smaller than the diameter of the wire elements laid on a long lead, and a plastic sheath tightly formed about and substantially surrounding and contacting each of said wire elements so as to substantially maintain the convolutions of said first and second wire layers in their longitudinally spaced relationship.

3. A flexible conduit assembly as set forth in claim 2 in which the wire elements of the first and second layers are substantially one-half the diametral size of the long lead wire elements.

4. A flexible conduit as set forth in claim 3 in which said plastic sheath engages the long lead wire elements.

References Cited by the Examiner

UNITED STATES PATENTS

| | | | |
|---|---|---|---|
| 761,879 | 6/1904 | Costello | 138—134 |
| 1,914,455 | 6/1933 | Pahl | 138—130 |
| 2,732,861 | 1/1956 | Gilmore | 138—134 X |
| 2,969,812 | 1/1961 | De Ganshl | 138—144 X |
| 3,002,534 | 10/1961 | Noland | 138—141 |
| 3,015,969 | 1/1962 | Bratz | 138—133 X |
| 3,020,701 | 2/1962 | McCormick | 57—160 |
| 3,037,343 | 5/1962 | Haas et al. | 57—160 X |
| 3,063,303 | 11/1962 | Cadwallader | 138—125 X |

LAVERNE D. GEIGER, *Primary Examiner.*

EDWARD V. BENHAM, L. J. LENNY, *Examiners.*